US010291571B2

(12) United States Patent
Luu et al.

(10) Patent No.: US 10,291,571 B2
(45) Date of Patent: May 14, 2019

(54) MOBILE FULL-SCREEN NOTIFICATION USER INTERFACE

(71) Applicant: Facebook, Inc., Menlo Park, CA (US)

(72) Inventors: Francis Luu, San Francisco, CA (US); Brandon Marshall Walkin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 214 days.

(21) Appl. No.: 13/676,498

(22) Filed: Nov. 14, 2012

(65) Prior Publication Data

US 2014/0136993 A1 May 15, 2014

(51) Int. Cl.
*G06F 3/048* (2013.01)
*H04L 12/58* (2006.01)
*G06F 3/0482* (2013.01)
*G06F 3/0485* (2013.01)
*G06Q 50/00* (2012.01)

(52) U.S. Cl.
CPC ............. *H04L 51/32* (2013.01); *G06F 3/048* (2013.01); *G06F 3/0482* (2013.01); *G06F 3/0485* (2013.01); *G06Q 50/01* (2013.01)

(58) Field of Classification Search
CPC .. G06F 9/542; G06F 17/30867; G06F 3/0482; G06F 3/0485; G06F 3/048; H04L 51/32; H04L 12/1895; H04L 51/24; H04L 51/26; H04W 4/16; H04W 8/18; H04W 4/02; H04W 4/023; G06Q 50/01
USPC ........................................................ 715/753
See application file for complete search history.

(56) References Cited

U.S. PATENT DOCUMENTS

| | | | | |
|---|---|---|---|---|
| 6,931,601 | B2 * | 8/2005 | Vronay | G06F 3/0481 |
| | | | | 345/426 |
| 8,583,759 | B2 * | 11/2013 | Harrison et al. | 709/217 |
| 8,924,493 | B1 * | 12/2014 | Yeskel | G06F 9/542 |
| | | | | 709/206 |
| 8,983,440 | B1 * | 3/2015 | Saylor | H04W 4/16 |
| | | | | 455/415 |
| 2007/0282887 | A1 * | 12/2007 | Fischer | G06F 17/30867 |
| 2008/0040673 | A1 * | 2/2008 | Zuckerberg et al. | 715/745 |
| 2009/0033877 | A1 * | 2/2009 | Choi et al. | 353/36 |
| 2009/0248635 | A1 * | 10/2009 | Gross | 707/3 |
| 2010/0023341 | A1 * | 1/2010 | Ledbetter et al. | 705/1 |
| 2010/0122327 | A1 * | 5/2010 | Linecker et al. | 726/6 |
| 2011/0004845 | A1 * | 1/2011 | Ciabarra | 715/808 |
| 2012/0060105 | A1 * | 3/2012 | Brown et al. | 715/753 |
| 2012/0278722 | A1 * | 11/2012 | Raleigh | H04L 12/14 |
| | | | | 715/735 |
| 2012/0290953 | A1 * | 11/2012 | Russell et al. | 715/758 |
| 2013/0007665 | A1 * | 1/2013 | Chaudhri et al. | 715/830 |
| 2013/0029760 | A1 * | 1/2013 | Wickett | G07F 17/3267 |
| | | | | 463/29 |

(Continued)

*Primary Examiner* — Renee D Chavez
*Assistant Examiner* — Jianmei F Duckworth
(74) *Attorney, Agent, or Firm* — Baker Botts L.L.P.

(57) ABSTRACT

In one embodiment, a client computing device receives a notification for a user associated with the client computing device and, without user input, displays the notification on a screen of the client computing device. The display of the notification may fill at least substantially a display area of the screen. The display of the notification may also include content of the notification, an indication of a source of the notification, and a user-activatable element associated with a social action for the user to take in response to the notification.

14 Claims, 8 Drawing Sheets

(56) References Cited

U.S. PATENT DOCUMENTS

2013/0091206 A1\* 4/2013 Moraes et al. .............. 709/204
2014/0074921 A1\* 3/2014 Poornachandran .......................... G06F 17/30867
709/204
2014/0344721 A1\* 11/2014 Prakash .................. 715/753
2015/0278857 A1\* 10/2015 Moon ............... G06Q 30/0252
705/14.5

\* cited by examiner

MOBILE FULL-SCREEN NOTIFICATION USER INTERFACE

TECHNICAL FIELD

This disclosure generally relates to user interfaces.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a client computing device may display an incoming notification for a user in a full-screen notification user interface. The full-screen notification user interface may encompass an entire area of the client computing device's display screen. The full-screen notification user interface may comprise some content of the notification, an indication of a source of the notification, and a selectable element associated with a social action for the user to take in response to the notification.

DESCRIPTION OF EXAMPLE EMBODIMENTS

Figure 1:
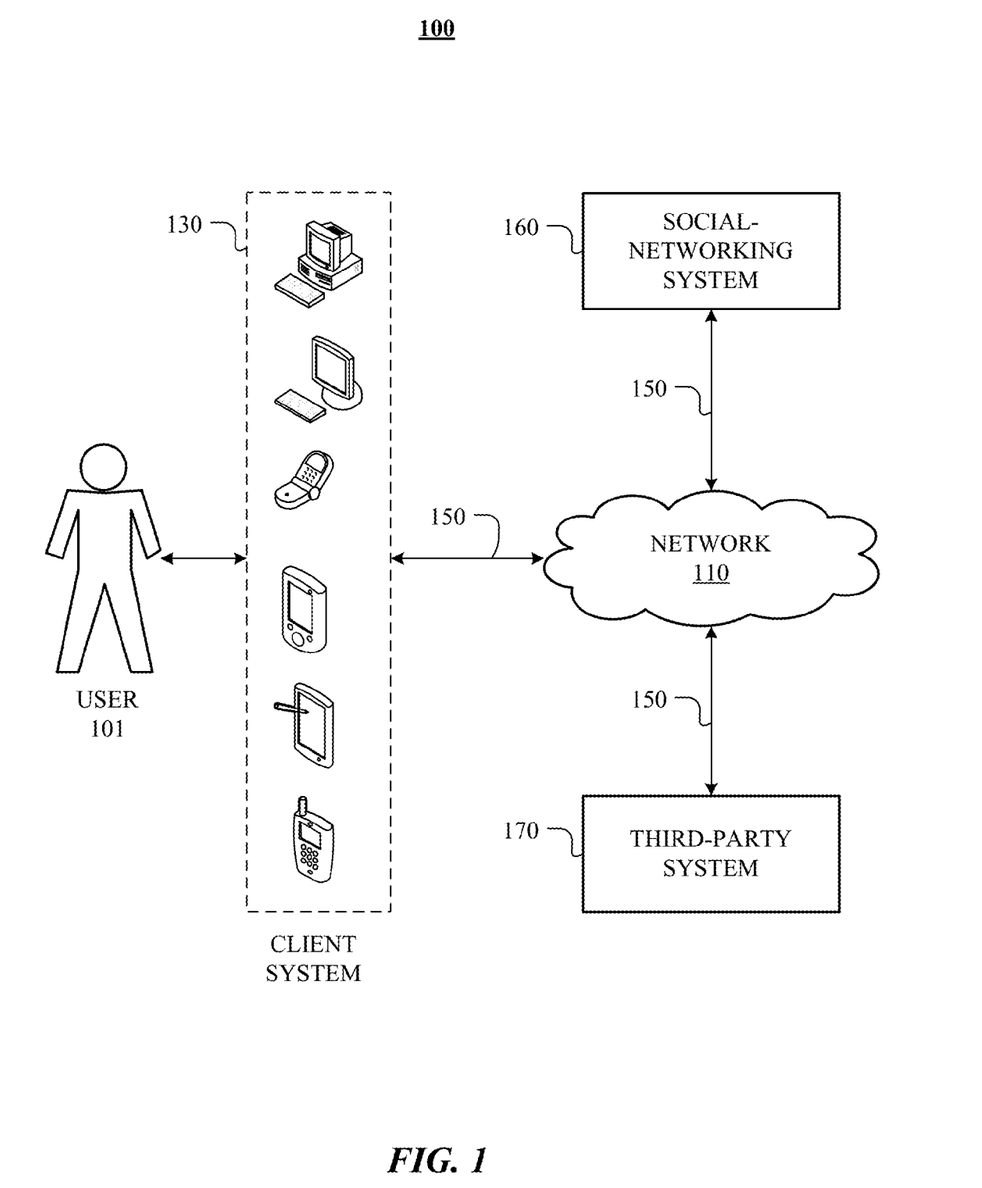
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host websites or applications. Third-party system 170 may generate, store, receive, and transmit third-party system data, such as, for example and without limitation, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
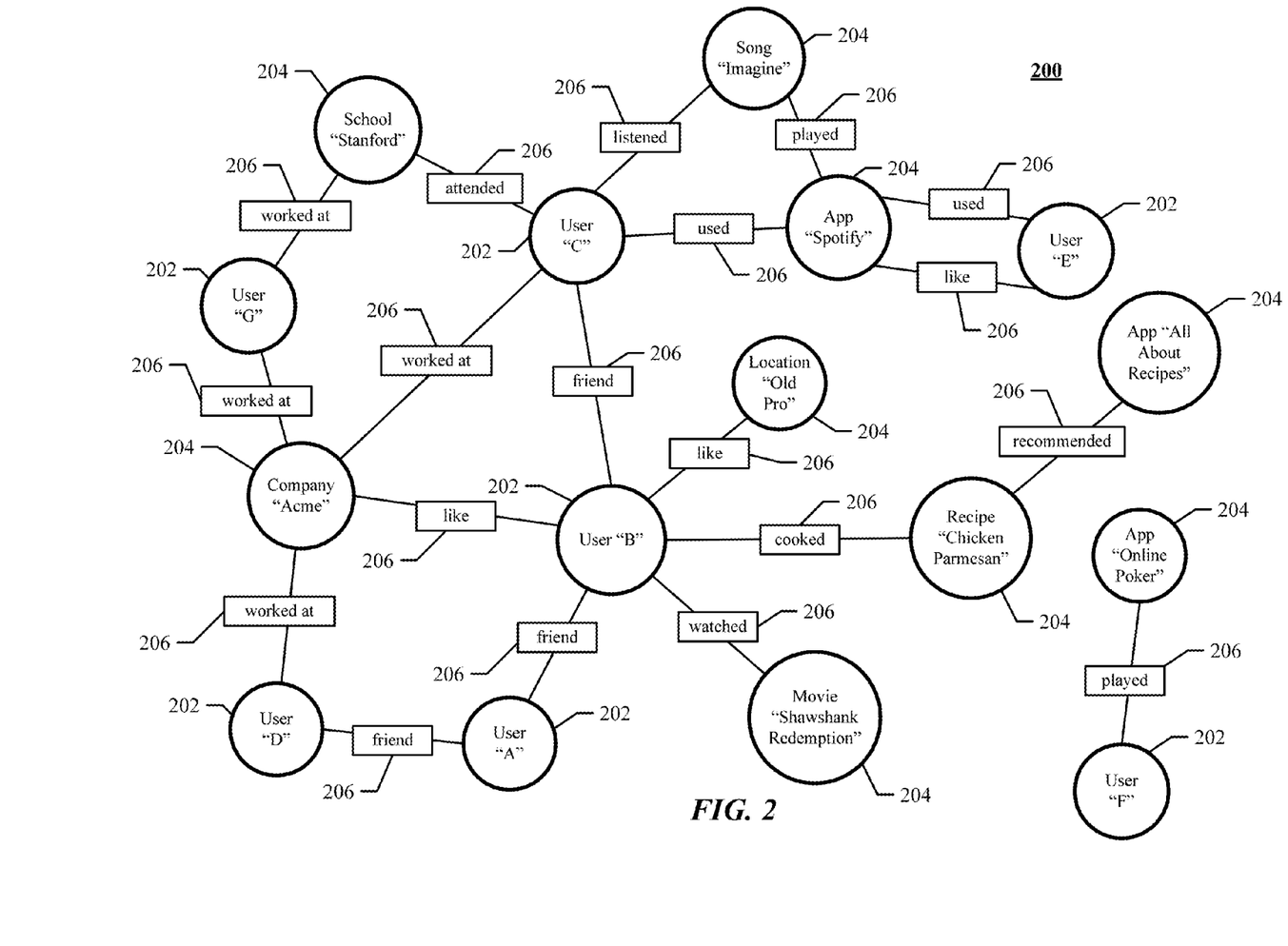
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

The social-networking system may provide to a user frequently update content based on recorded activities or actions that may be related to the user. In particular embodiments, the social-networking system may support a news-feed service. In particular embodiments, a news feed may comprise a data format including one or more news-feed stories. Each news-feed story may include content related to a specific subject matter or topic. In particular embodiments, the social-networking system may aggregate activities or actions related to a specific user action into a news-feed story. For example, a first user may post a photo to the social-networking system, while other users of the social-networking system may perform various activities or actions related to the photo. Other users may "like" the photo, post comments related to the photo, or tag one or more particular users to the photo. The social-networking system may aggregate activities related to the photo into a news-feed story comprising an image of the photo, a profile picture of the first user, a count of "likes" of the photo by other users, and one or more comments related to the photo. As for another example, a first user may checks in to a webpage (maintained by the social-networking system or a third-party system) corresponding to a place (e.g., a landmark, a restaurant, a department store). Other users of the social-networking system may "like" the check-in activity, or post comments related to the check-in activity. The social-networking system may aggregate activities related to the check-in activity into a news-feed story comprising a link and an image of the webpage, a profile picture of the first user, a count of "likes" of the check-in activity by other users, and one or more comments related to the check-in activity. The social-networking system may also aggregate into the news-feed story update to the webpage, or advertising related to the webpage (e.g., on-line coupons from a business related to the webpage). In particular embodiments, the social-networking may present a news feed including one or more news-feed stories to a viewing user. For example, an application (e.g., a web browser) hosted by a client device of the viewing user may retrieve a news feed from the social-networking system and display the news feed in the application's user interface. The application may display each news-feed story in the news feed in a respective frame (e.g., an HTML iFrame) in the application's user interface.

The social-networking system may aggregate activities or actions into news-feed stories based on social-graph information. For example, the social-networking system may aggregate for a viewing user a news feed including news-feed stories related to activities or actions performed by users who are within a specified degree of separation (e.g., within two degrees of separation) from the viewing user on the social graph. The social-networking system may aggregate activities or actions into news-feed stories based on privacy settings. For example, a user may specify which other users can access information of a particular activity performed by the user. The social-networking system may aggregate for a viewing user a news feed including news-feed stories related to activities accessible to the viewing user.

The social-networking system may provide a notification service to users of the social-networking system. For example, a server of the social-networking system may transmit a notification (e.g., "It's your dad's birthday") to a user's client computing device, causing the client computing device to display the notification in a user interface (e.g., displaying the notification in a frame within a web browser window). Particular embodiments describe methods for displaying notifications on a client computing device. Particular embodiments may display a notification in a full-screen user interface that encompasses an entire display area of a screen of the client computing device.

Figure 3:
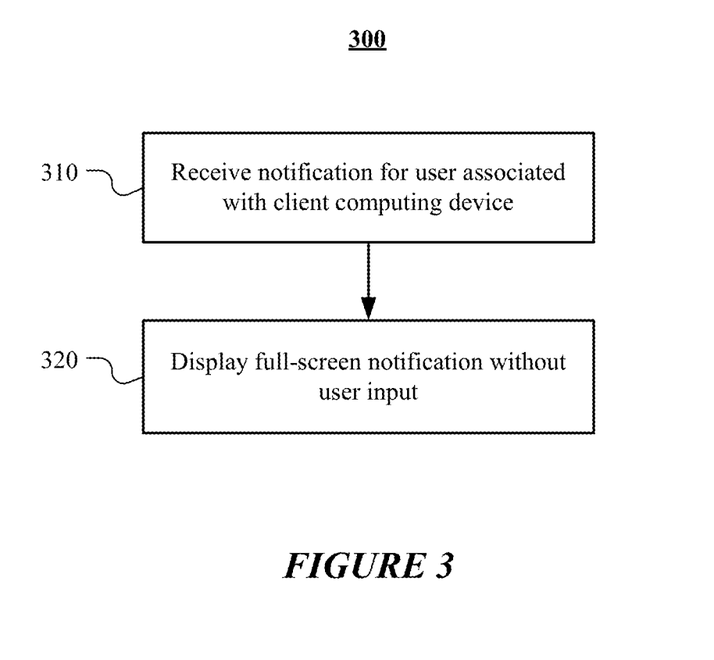
FIG. 3 illustrates an example method for displaying a notification in a full-screen user interface.

FIG. 3 illustrates an example method 300 for displaying a notification in a full-screen user interface. The example method 300 may be implemented by a client computing device. For example, the example method 300 may be implemented by a process of an application (or an operating system) running on one or more processors of a client computing device. The client computing device may be a desktop personal computer, a laptop computer, a cellular telephone, a smartphone, a tablet computer, or any suitable mobile computing device. The example method 300 may begin at step 310. At step 310, in particular embodiments, the client computing device may receive a notification for a user associated with the client computing device. The client computing device may receive the notification from the social-networking system. This disclosure contemplates any suitable notifications that may be provided to a user by the social-networking system. For example and without limitation, a notification can be a message, an event reminder, an update related to an action or activity of the user or the user's social contact, a news-feed story, or an advertisement.

At step 320, in particular embodiments, the client computing device may, without user input, display the notification on a screen of the client computing device. In particular embodiments, the display the notification on the screen may fill an entire display area of the screen. That is, the client computing device may display the notification in a full-screen notification user interface encompassing the entire display area of the screen. In particular embodiments, the full-screen notification user interface may comprise at least some content of the notification, an indication of a source of the notification, and a user-activatable element associated with a social action for the user to take in response to the notification.

Figure 4A:
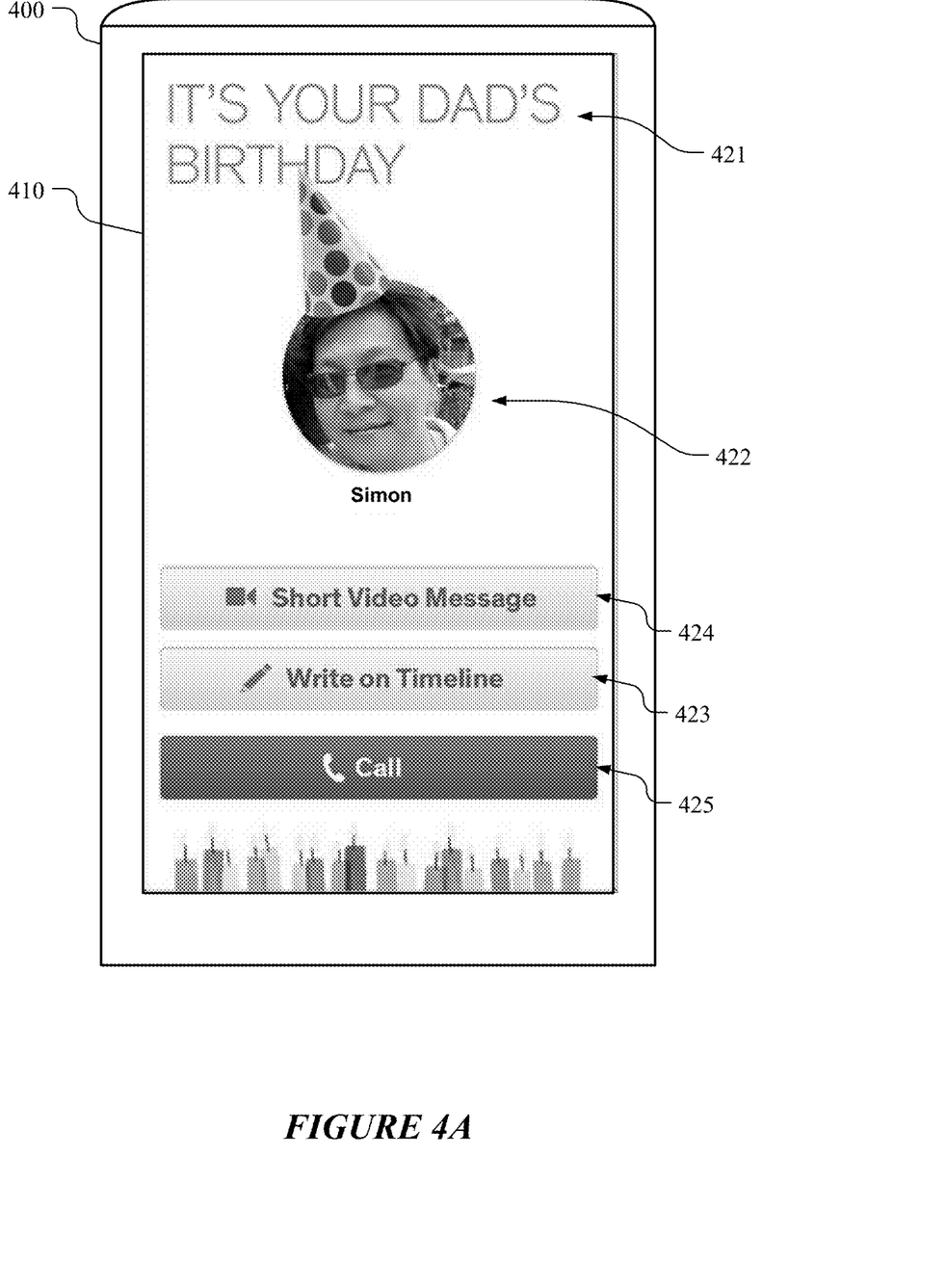
FIGS. 4A-4D illustrate example full-screen notification user interfaces.

FIG. 4A illustrates an example full-screen notification user interface. In the example of FIG. 4A, a client computing device 400 (e.g., a smartphone) may comprise a touch screen 410. The client computing device 400 may receive a notification from the social-networking system and display the notification filling the entire area of the touch screen 410. That is, the client computing device 400 may display the notification in a full-screen notification user interface. In one embodiment, the full-screen notification user interface may encompass the entire display area of the touch screen 410, except a small display area of the touch screen 410. For example, the full-screen notification user interface may encompass the entire display area of the touch screen 410, except a system notification bar (e.g., displaying a battery level indicator, a wireless carrier status, and a wireless signal strength indicator for a smartphone) at the top of the touch screen 410. The full-screen notification user interface may comprise some content of the notification—e.g., a message "IT'S YOUR DAD'S BIRTHDAY" 421. The full-screen notification user interface may also comprise an indication of a source of the notification—e.g., a profile picture 422 of the "DAD" in the message 421. The full-screen notification user interface may also comprise a user-activatable element associated with a social action for the user to take in response to the notification. For example, the full-screen notification user interface may include an selectable icon "Write on Timeline" 423 for the user to perform a social action in posting a comment on the source's profile page (that may be laid out in a timeline fashion). The user may select the selectable icon 423 (e.g., using a tap touch gesture, or a pointing device), causing the client computing device 400 to present a user interface (e.g., a frame) for the user to write a comment. Upon the user completing the comment, the client computing device 400 may transmit the comment to the social-networking system, causing the social-networking system to create a wall-post (comprising the comment) on the source's profile page. Similarly, the full-screen notification user interface may include a selectable icon "Short Video Message" 424 enabling the user to post a video clip to the source's profile page. The full-screen display of the notification may also include a selectable icon "Call" 425 enabling the user to place an audio or video call to the source from the mobile computing device 400. In particular embodiments, the user may dismiss the full-screen notification user interface. For example, the user of the client computing device 400 illustrated in FIG. 4A may perform a swipe touch gesture in a horizontal direction on the touch screen 410 to dismiss the full-screen notification user interface. After the dismissal of the full-screen notification user interface, the client computing device may display what was previously displayed on the screen before the full-screen notification user interface was displayed (e.g., a user interface of another software application running on the client computing device, a home screen of the client computing device, a locked screen, or a powered-down screen). The full-screen notification user interface may also be dismissed when the user takes an action related to a selectable icon displayed in the full-screen notification interface (e.g., placing a call by selecting the selectable icon "Call" 425 described above).

Figure 4B:
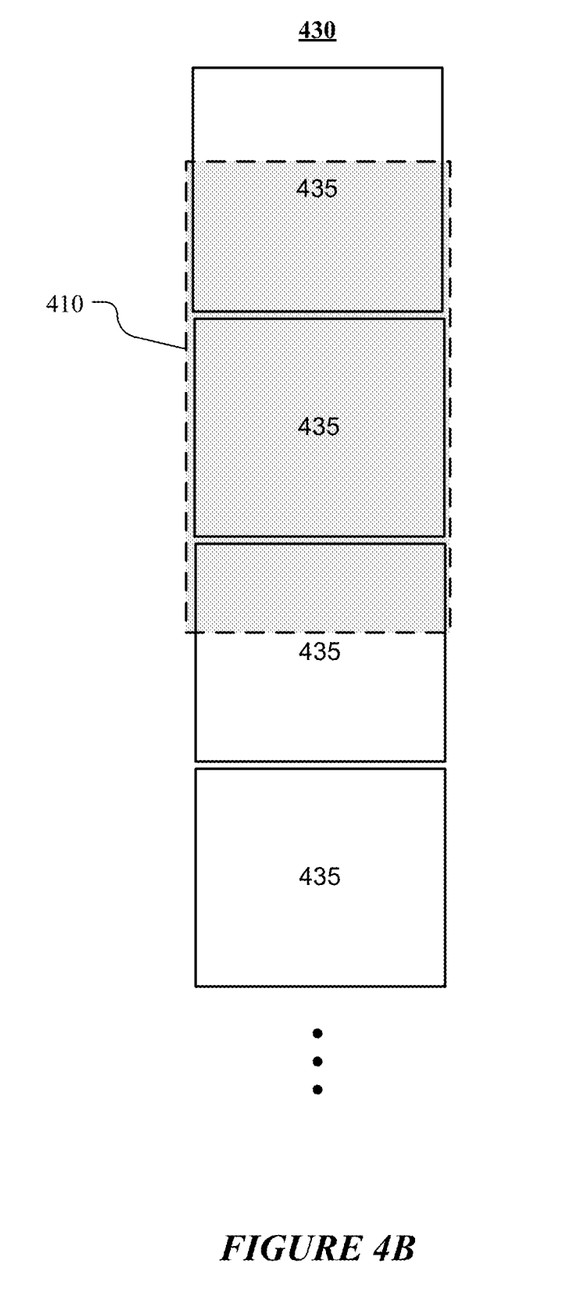

In particular embodiments, the display of the notification may comprise a scrollable stack of notifications filling the entire display area of the screen. FIG. 4B illustrates an example scrollable stack 430 of notifications. As illustrated in FIG. 4B, the scrollable stack 430 may comprise a stack of notifications 435. The scrollable stack may encompass the entire display area of the touch screen 410 of the client computing device 400 illustrated in FIG. 4A. A user of the client computing device 400 may perform a slide touch gesture on the touch screen 410 (or using a pointing device) to scroll up or down the scrollable stack 430. The scrollable stack 430 may be ordered based on recency. For example, a most recent notification may be placed on the top of the scrollable stack 430.

Figure 4C:
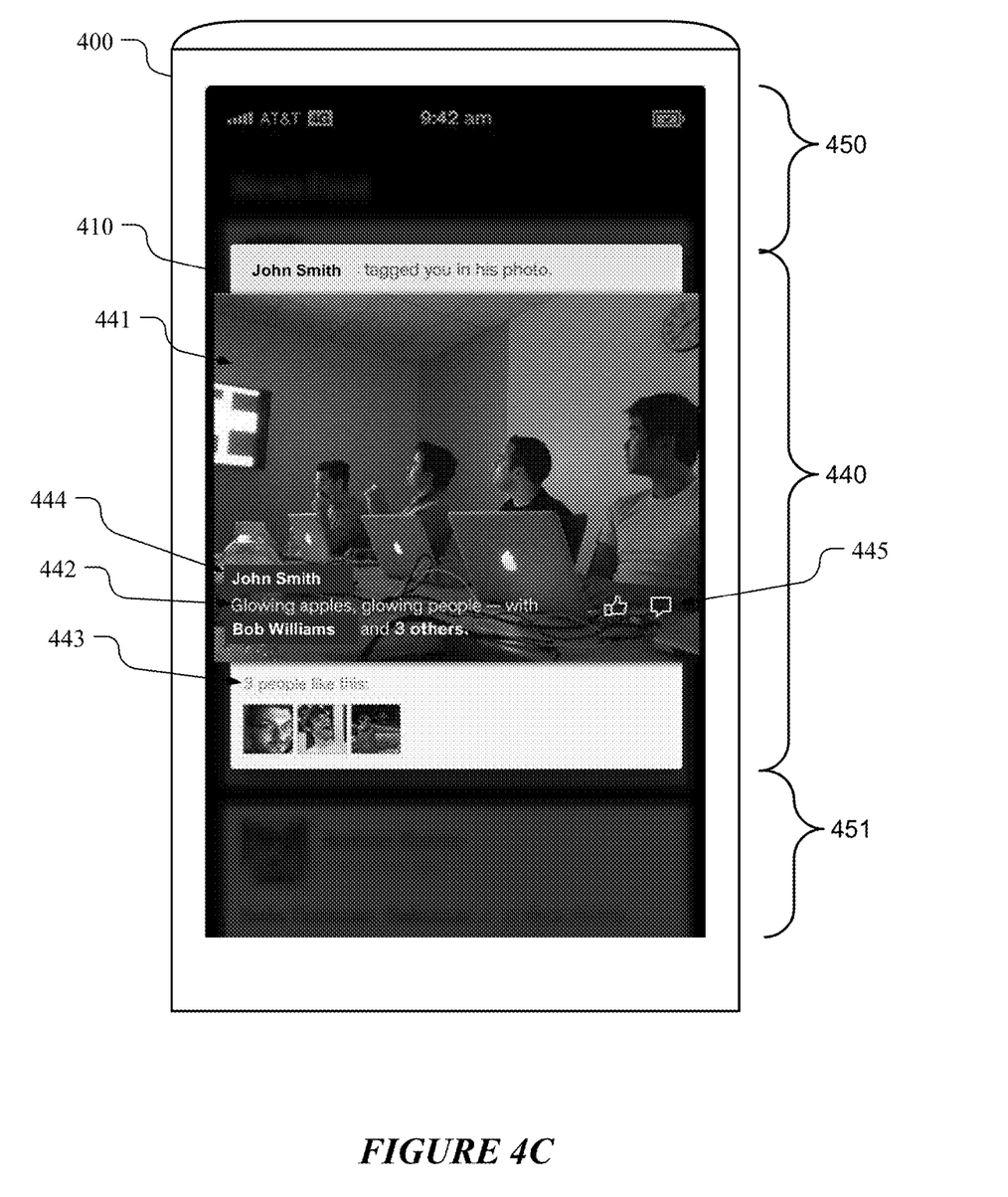

In particular embodiments, the full-screen notification user interface may completely overlay with the notification an interface of a software application of the client computing device that is open. The full-screen display of the notification may overlay the interface by decreasing a brightness of the interface. FIG. 4C illustrates another example of full-screen notification user interface. In the example of FIG. 4C, the client computing device 400 displays in its touch screen 410 a notification 440 overlaying an interface of another software application running on the client computing device 400. The brightness of the rest of the touch screen 410 (regions 450 and 451) is decreased. That is, the brightness of the portion of the interface that is not overlaid by the notification 440 is decreased to highlight the notification 440.

In particular embodiments, the notification may be a news-feed story delivered by the social-networking system. The notification may comprise a news-feed story with content related to a specific subject matter or topic of the news-feed story. As illustrated by the example full-screen notification user interface in FIG. 4C, the notification 440 may be a news-feed story about a photo posted by a user of the social-networking system. The display of notification 440 may comprise content of the news-feed story such as a photo 441, a comment 442 about the photo, and a count of "likes" for the photo (443). The display of the notification 440 may also comprise a source of the photo "John Smith" (444). The display of notification 440 may also comprise a user-activatable element 445 enabling a viewing user to perform a social action in commenting about the photo.

In particular embodiments, the notification may comprise content related to a major life event of a user of the social-networking system. A major life event may be new job, retirement, new school, study abroad, volunteer work, military service, first met, new relationship, engagement, marriage, new child, new family member, new pet, end of relationship, loss of a loved one, moved, bought a home, home improvement, new roommate, new vehicle, overcame an illness, quit a habit, new eating habits, weight loss, glasses, contacts, other, broken bone, new hobby, new instrument, new language, tattoo or piercing, new license, travel, achievement or award, changed beliefs, first word, first kiss, new sport, or any suitable life event. A user may record a major life event with the social-networking system (e.g., by filling out an on-line form), causing the social-networking system to store the major life event (e.g., storing with a user node of the user in a social graph of the social-networking system). The social-networking system may determine a major life event of a user based on an explicit indication from the user (e.g., as the user records a major life event with the social-networking system). The social-networking system may also determine a major life event of a user implicitly based on social-graph information associated with the user (e.g., based on a major life event previously recorded in the social graph, such as a birthday, an anniversary).

Figure 4D:
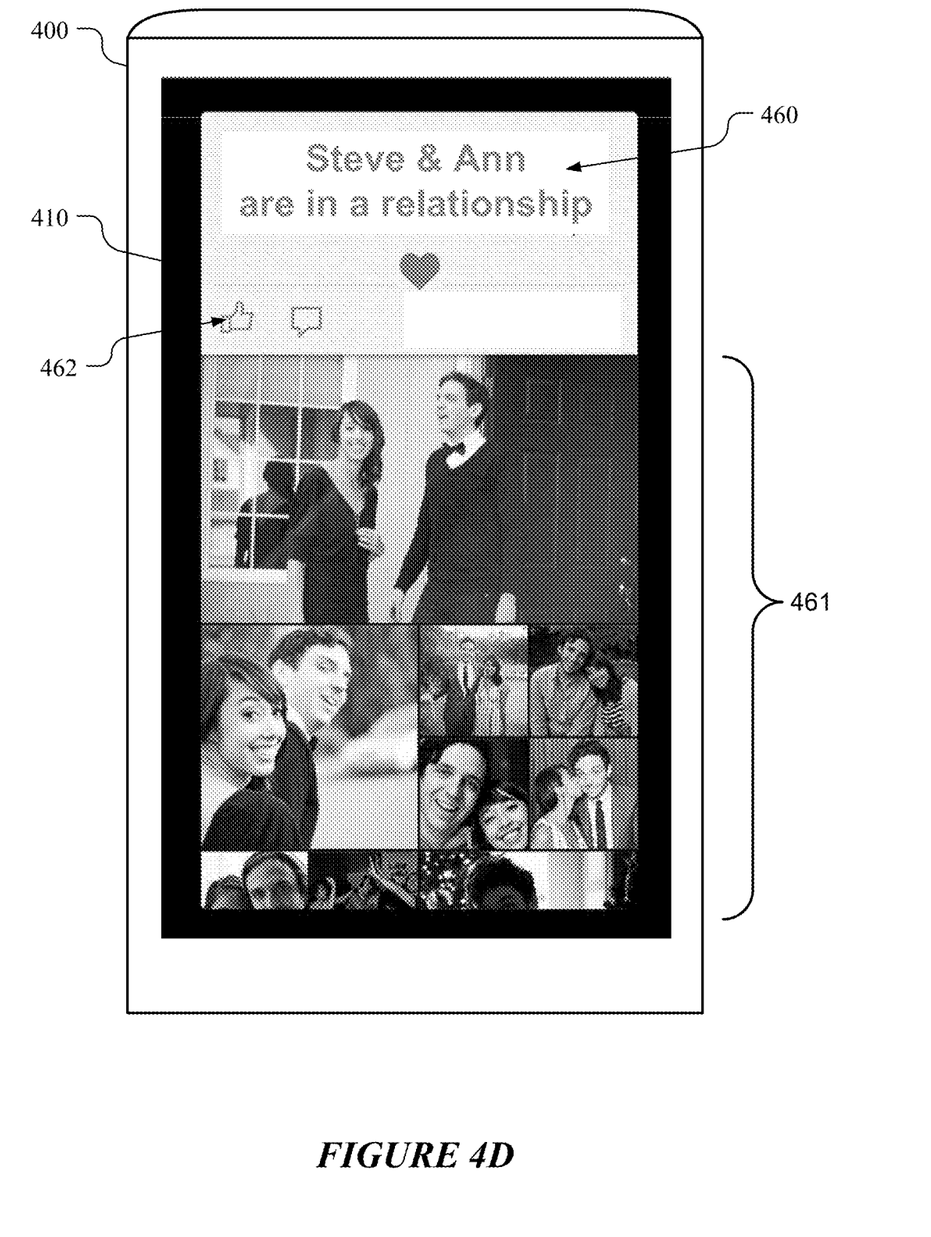

In particular embodiments, the social-networking system (e.g., a server of the social-networking system) may determine a major life event of a first user. The social-networking system may access a social graph of the social-networking system for content related to the major life event. The social-networking system may create a notification comprising content related to the major life event, and transmit the notification to respective client computing device of each of the user's social contacts (e.g., the user's first-degree connections in a social graph). For example, the social-networking system may receive an indication that a user "Steve" is now in a relationship with another user "Ann" (i.e., a major life event in a new relationship). The social-networking system may access a social graph for one or more photos that both "Steve" and "Ann" are tagged (or any suitable object having any suitable edges connecting to both user nodes for "Steve" and "Ann" in the social graph). The social-networking system may create a notification comprising the photos, and transmit the notification to social contacts of "Steve" (or "Ann"). The notification may further comprise an indication that the notification is about a major life event (i.e., a new relationship). As described with the example method 300, a client computing device of a social contact of "Steve" may receive the notification, and display on a screen of the client computing device the notification filling an entire display area of the screen. That is, the client computing device may display the notification of a major life event in a full-screen notification user interface, as illustrated in FIG. 4D. In the example of FIG. 4D, the full-screen notification user interface displayed in the screen 410 of the client computing device 400 may comprise some content of the notification and an indication of a source of the notification—e.g., photos of "Steve" and "Ann" in the region 461 and a message "Steve and Ann are in a relationship" 460. The full-screen notification user interface may also comprise a user-activatable element associated with a social action—e.g., a selectable "like" icon 462.

In one embodiment, the client computing device may display the notification in a full-screen notification user interface only if the notification is of a pre-determined type. For example, the client computing device may display a particular notification in a full-screen notification user interface, only if the client computing device determines that the particular notification is about a major life event (e.g., based on an indication included in the notification as described earlier). In another embodiment, the user of the client computing device may configure the pre-determined type, and store the configuration in the client computing device (e.g., in a local storage of the client computing device). For example, the user may configure that only notifications related to the user's immediate family members (e.g., parents, siblings, spouse, children) may be displayed in a full-screen notification user interface.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 5:
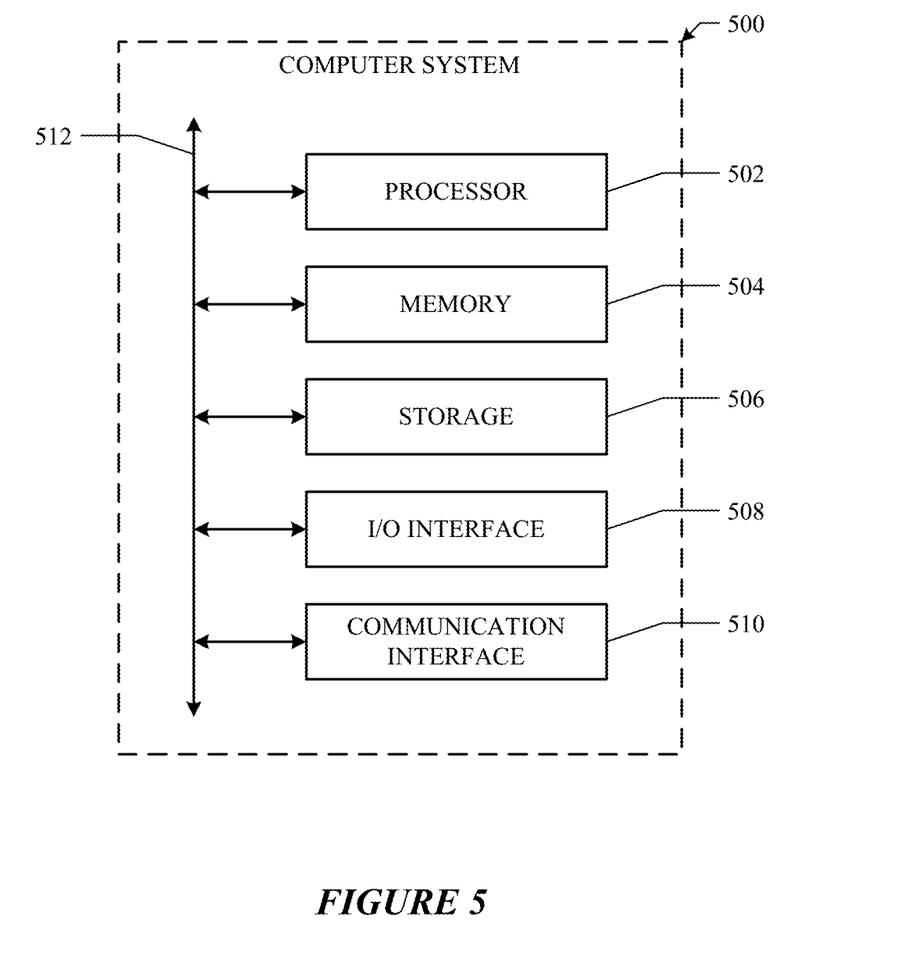
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a client computing device associated with a first user of a social-networking system, receiving a notification regarding a major life event associated with a second user and a third user of the social-networking system while displaying a user interface associated with the social-networking system, the notification being displayed on a first layer of the user interface, wherein the first user is a social contact of one or more of the second user or the third user on the social-networking system and the major life event associated with the second user and the third user comprises a marriage, an engagement, a start of a relationship, an end of a relationship, purchase of a vehicle, purchase of home, or birth of a child; and
    by the client computing device, without input from the first user and in response to determining that the notification corresponds to a pre-determined event type that is suitable for presenting in a full-screen notification user interface based on an importance of the event type indicated by the first user and an affinity between the first user and the second or third users, displaying the notification regarding the major life event associated with the second and third users of the social-networking system on an entire display area of a screen of the client computing device of the first user, the display of the notification being on a second layer overlaying the first layer of the user interface associated with the social-networking system such that one or more portions along the edges of the notification are displayed with decreased brightness, the display of the notification comprising:
    a content of the notification, the content comprising one or more photos tagging the second user and the third user, wherein the content is accessed from a social graph of the social-networking system, the content being identified based on one or more edges in the social graph connecting both the second user and the third user related to the major life event;
    information identifying the second user and the third user associated with the notification; and
    a user-activatable element providing functionality to begin an interaction through the social-networking system between the first user and one or more of the second user or the third user in response to the notification.

2. The method of claim 1, wherein the client computing device is a mobile client computing device.

3. The method of claim 1, wherein the display of the notification comprises a scrollable stack of notifications, and wherein at least one notification of the scrollable stack of notifications is outside the display area of the screen.

4. The method of claim 3, wherein a most recent one of the notifications is on a top of the scrollable stack.

5. The method of claim 1, wherein the displaying the notification comprises overlaying the notification over an interface of a software application of the client computing device that is open.

6. The method of claim 1, wherein the notification is displayed on the screen to overlay the entire display area of the screen of the client computing device only if the notification is of the pre-determined event type that is configurable by the first user.

7. The method of claim 1, wherein the major life event is determined implicitly by the social-networking system based on social-graph information associated with the second user or the third user in the social-networking system.

8. One or more computer-readable non-transitory storage media embodying software that is operable when executed to:
    receive a notification for a first user of a social-networking system, the notification regarding a major life event associated with a second user and a third user of the social-networking system while displaying a user interface associated with the social-networking system, the notification being displayed on a first layer of the user interface, wherein the first user is a social contact of one or more of the second user or the third user on the social-networking system and the major life event associated with the second user and the third user comprises a marriage, an engagement, a start of a relationship, an end of a relationship, purchase of a vehicle, purchase of home, or birth of a child; and
    without input from the first user and in response to determining that the notification corresponds to a pre-determined event type that is suitable for presenting in a full-screen notification user interface based on an importance of the event type indicated by the first user and an affinity between the first user and the second or third users, display the notification regarding the major life event associated with the second and third users of the social-networking system on an entire display area of a screen of a client computing device associated with the first user, the display of the notification being on a second layer overlaying the first layer of the user interface associated with the social-networking system such that one or more portions along the edges of the notification are displayed with decreased brightness, the display of the notification comprising:
    a content of the notification, the content comprising one or more photos tagging the second user and the third user, wherein the content is accessed from a social graph of the social-networking system, the content being identified based on one or more edges in the social graph connecting both the second user and the third user related to the major life event;
    information identifying the second user and the third user associated with the notification; and a user-activatable element providing functionality to begin an interaction through the social-networking system between the first user and one or more of the second user or the third user in response to the notification.

9. The media of claim 8, wherein the client computing device is a client computing device.

10. The media of claim 8, wherein the display of the notification comprises a scrollable stack of notifications, and wherein at least one notification of the scrollable stack of notifications is outside the display area of the screen.

11. The media of claim 10, wherein a most recent one of the notifications is on a top of the scrollable stack.

12. The media of claim 8, wherein, to display the notification, the software is further operable when executed by the client computing device to overlay the notification over an interface of a software application of the client computing device that is open.

13. The media of claim 8, wherein the notification is displayed on the screen to overlay the entire display area of the screen of the client computing device only if the notification is of the pre-determined event type that is configurable by the first user.

14. The media of claim 8, wherein the major life event is determined implicitly by the social-networking system based on social-graph information associated with the second user or the third user in the social-networking system.

* * * * *